United States Patent [19]

Saito

[11] Patent Number: 4,909,848
[45] Date of Patent: Mar. 20, 1990

[54] DRY GROUTING AGENT AND METHOD OF PRODUCING THE SAME
[75] Inventor: Shiro Saito, Tokyo, Japan
[73] Assignee: Nikka Limited, Tokyo, Japan
[21] Appl. No.: 347,275
[22] Filed: May 4, 1989
[51] Int. Cl.$^4$ .................. C04B 24/40; C04B 24/42
[52] U.S. Cl. .................................. 106/90; 428/405
[58] Field of Search ........................ 106/90; 428/405
[56] References Cited

U.S. PATENT DOCUMENTS 3,219,511  3/1973  Berard et al. .................. 106/90

FOREIGN PATENT DOCUMENTS 61-211417  9/1986  Japan .

Primary Examiner—Mark L. Bell
Assistant Examiner—David M. Brunsman
Attorney, Agent, or Firm—Oblon, Spivak, McClelland, Maier & Neustadt

[57] ABSTRACT

A dry grouting agent comprises cement particles having baked on the surface thereof a coating including a water-soluble silicon resin and a surface active agent. The grouting agent is produced by preparing a liquid mixture including a water-soluble silicon resin, a surface active agent and an oily solvent, adding the liquid mixture to cement particles and uniformly kneading it therewith, heating the result to evaporate off the oily solvent and water and to bake onto the cement particles a coating layer containing the water-soluble silicon and the surface active agent, and cooling and pulverizing the resulting solid mass.

9 Claims, No Drawings

4,909,848

DRY GROUTING AGENT AND METHOD OF PRODUCING THE SAME

BACKGROUND OF THE INVENTION

1. Field of the Invention

This invention relates to a dry grouting agent for injection into porous, water-permeable weak ground so as to make the ground impermeable to water, and to a method of preparing the same.

2. Prior Art Statement

In the dry grouting method, it is generally considered that the diameter of the particles to be injected into the weak ground should be of such size as to enable the particles to penetrate together with the blown-in air into the gaps ($30-40\mu$) in a 10 cm-thick layer of standard sand of a mean particle size of $100-300\mu$.

To meet this requirement, Japanese Patent Public Disclosure 61(1986)-211417 discloses a method of blowing in ultra-fine cement particles having a mean diameter of not more than $4\mu$.

However, even when such ultra-fine cement particles are used, it is difficult to achieve deep penetration into the gaps within the ground because the rough surfaces of the particles prevents them from sliding easily. Moreover, the use of such fine particles disadvantageously makes it necessary to use a high blowing pressure.

In light of these circumstances, a dry grouting agent should preferably contain cement particles which have a diameter of not more than $10\mu$, preferably between 2 and $7\mu$, which have smooth surfaces and, accordingly, good slipperiness and which nevertheless exhibit the hydrophilic property required for their agglomeration upon contact with water.

OBJECT AND SUMMARY OF THE INVENTION

One object of this invention is to provide a dry grouting agent which exhibits better penetrability than conventional ultra-fine particle cement and which is capable of forming a wall with high water-barrier effect.

Another object of this invention is to provide a method of producing the aforesaid dry grouting agent.

For realizing the first object mentioned above, the present invention provides a dry grouting agent comprising cement particles of a mean diameter of not more than $10\mu$, preferably $2-7\mu$, which particles have baked thereon a coating layer containing a water-soluble silicon resin and a surface active agent.

For realizing the second object mentioned above, the present invention provides a method of producing a dry grouting agent comprising the steps of preparing a liquid mixture including a water-soluble silicon resin, a surface active agent and an oily solvent, adding the liquid mixture to cement particles having a mean particle diameter of $2-7\mu$ and uniformly kneading it therewith, heating the result to evaporate off the oily solvent and water and to bake onto the cement particles a coating layer containing the water-soluble silicon and the surface active agent, and cooling and pulverizing the resulting agglomerated mass.

In the dry grouting agent according to this invention, the water-soluble silicon resin contained in the coating layer baked onto the surface of the cement particles causes the coating layer to assume a vitreous state which provides the particles with good slipperiness. As a result, the particles exhibit excellent penetrability. Further, the surface active agent contained in the coating makes it hydrophilic so that when the particles come in contact with water, the coating will gradually absorb water and wet the particles, whereby the cement particles at the interior will cause the grouting agent particles to adhere to each other, eventually to agglomerate into a solid mass. As a result, there is formed a wall exhibiting a high water-barrier effect.

The above and other features of the present invention will become apparent from the following description.

DETAILED DESCRIPTION OF THE PREFERRED EMBODIMENT

As was mentioned earlier, for ensuring reliable penetration into small gaps a dry grouting agent should preferably contain cement particles of a diameter of not more than $10\mu$ which have smooth surfaces and, accordingly, good slipperiness. At the same time, the particles should have the hydrophilic property required for their agglomeration upon contact with water.

Through his research toward the development of a dry grouting agent with these properties, the inventor discovered that when a coating comprising a water-soluble silicon resin and a surface active agent is provided on individual particles of cement destined to agglomerate as a result of hydration-adhesion occurring through a chemical reaction in the particles at the time of contact with water, the particles are covered with a vitreous coating that makes them slippery, and when they come in contact with water they gradually absorb water because of the presence of the surface active agent so that the cement particles eventually agglomerate to form a wall with a high water-barrier effect. This invention was achieved on the basis of this discovery.

As the water-soluble resin for forming the vitreous coating layer according to this invention there can be used ordinary sodium methylsiliconate or alternatively sodium dimethylsiliconate, sodium trimethylsiliconate or polymers of any of these. Additionally usable are such silane coupling agents as methyltrimethoxysilane and methyltriethoxysilane, and also polyethyl denatured dimethylsiloxane. Moreover, usable compounds are not limited to the aforementioned but include all types of water-soluble silicon resins without limitation. However, it should be noted that use of oily silicon resins is not preferable because they tend to produce a rubbery coating layer with relatively poor slipperiness. The amount of the silicon resin used is between about 0.2 and 20 parts per 100 parts of the cement used.

Surface active agents can be classified into anionic, cationic, nonionic and amphoteric types. Any of these types can be used in the present invention either alone or in combination with others. While the amount of surface active agent used will vary depending on the desired thickness and degree of hydration desired of the coating, it is generally in the range of 0.01 to 10 parts per 100 parts of the cement.

Use of an ester type surface active agent containing an organic acid or phosphate should be avoided since in the presence of the strongly alkaline cement it is apt to have its effect degraded by hydrolysis. The thickness of the coating layer is preferably in the range of 1-100 nanometer.

The dry grouting agent according to this invention is produced by forming a coating of the aforesaid nature on individual cement particles. For this, the water-soluble silicon resin and the surface active agent are mixed together in a liquid and then added to the cement particles. Water cannot be used as the liquid, however, since it would cause the cement particles to solidify. In this invention, therefore, the water-soluble silicon and the surface active agent are mixed together in an oily solvent. The resulting mixture is then added to the cement particles and kneaded together therewith.

As the oily solvent there can be used any type capable of being uniformly mixed with the water-soluble silicon resin, specific examples being such lower alcohols as methanol, ethanol, propanol and tertiary butanol, sulfones such as dimethylsulfoxide and such amides as dimethylformamide.

Many water-soluble silicon resins are of the sodium salt type which frequently entail the problem of not dissolving well into a solvent or, alternatively, of precipitating when a solvent is added thereto. Thus the amount of the solvent to be used must be determined appropriately for the particular silicon resin used so that a precipitate will not be formed even when the solvent and the resin are uniformly blended.

Also, since the ability of an oily solvent to dissolve the silicon resin decreases with increasing carbon number, there should be used an oily solvent with the lowest carbon number possible.

The most appropriate oily solvent proves to be methanol, not only from the point of its low carbon number but also from the points that it is economical, is an excellent solvent of water-soluble resin, and has a low boiling point which makes it easy to separate and recover. The amount of the oily solvent used is in the range of 1-50 parts per 100 parts of the cement.

The liquid mixture obtained by dissolving the water-soluble silicon resin and the surface active agent in the oily solvent is added to cement particles of a diameter of not more than $10\mu$, preferably of $2-7\mu$. The addition is carried out by spraying the mixture onto the cement particles, followed by kneading.

The cement particles coated with the liquid mixture are placed in a sealed container and heated to 100° C. or less so as to dry the same by driving off the oily solvent and the moisture coming from the water-soluble silicon resin.

The temperature is then further maintained at about 100° C. to condensation polymerize the water-soluble silicon resin on the surface of the cement particles, thereby forming a smooth coating layer on the surface of the particles.

As the cement particles treated in this way stick together in an agglomerated mass, they are first cooled and then pulverized in an appropriate crusher such as a ball mill or an impact type high-speed crusher. As a result the agglomerated mass is broken down into cement particles individually coated with a glass-like material, whereby there is obtained a dry grouting agent consisting of fine particles having substantially the same diameter as the starting material.

The dry grouting agent produced in the aforesaid manner according to this invention and intended for blowing into weak ground has its particle surfaces covered with a vitreous coating and thus exhibits excellent slipperiness. It is therefore immeasurably superior in penetrability to the conventional grouting agent consisting of ultra-fine cement particles and is capable of forming a wall having a high water-barrier effect.

The invention will now be explained with respect to nonlimitative examples.

EXAMPLE 1

A liquid mixture consisting of 10 parts methanol as the oily solvent, 5 parts sodium methylsiliconate (Dryseal C, product of Toray Silicone Co., Ltd., Japan) as the water-soluble silicon resin and 0.05 part surface active agent (polyester type Pegnol ST-7, product of Toho Chemical Ind. Co., Ltd., Japan) was sprayed with simultaneous stirring onto 100 parts of commercially available MC cement having a mean particle diameter of $2-7\mu$ (Allofix MC, product of Onoda Cement Co., Ltd., Japan) and the liquid mixture and cement particles were kneaded together for 30 minutes to mix them uniformly. The result was transferred to a sealed container and heated to 60°-70° C., while the methanol and a small amount of water from the water-soluble silicon resin were drawn off by suction and recovered. The temperature of the cement particles dried in this manner was then increased to 100° C. and subjected to heat treatment for about 1 hour to condensation polymerize the water-soluble silicon resin and complete formation of a baked-on coating on the cement particles. The resulting mass was cooled and then transferred from the sealed container to a ball mill wherein it was pulverized to obtain a grouting agent consisting of $2-7\mu$ particles having a vitreous surface coating.

EXAMPLE 2

A liquid mixture consisting of 20 parts dimethylsulfoxide as the oily solvent, 1 part of the same water-soluble silicon resin as used in Example 1 and 0.2 part surface active agent (polyester type Noigen EA50, product of Dai-ichi Kogyo Seiyaku K.K., Japan) was sprayed with simultaneous mixing onto 100 parts of the same MC cement as used in Example 1 and the liquid mixture and cement particles were kneaded together for 30 minutes to mix them uniformly. The result was then transferred to a sealed container and heated to 90°-100° C., while the dimethylsulfoxide and a small amount of water were drawn out of the system by suction and recovered. The temperature of the cement particles dried in this manner was then increased to 100° C. and subjected to heat treatment for about 1 hour to condensation polymerize the water-soluble silicon resin and complete formation of a baked-on coating on the cement particles. The resulting mass was cooled and then transferred from the sealed container to a high-speed crusher wherein it was pulverized to obtain a grouting consisting of fine particles having a vitreous surface.

Quality Evaluation Tests (1) Ground penetration depth test

A weak ground model was formed by charging Toyoura standard sand of a particle size of $100-300\mu$ into a pressure-proof glass cylinder measuring 100 mm in diameter and 100 mm in height. A 10 g sample of the grouting agent was blown into the model sand layer as entrained by an air stream, for about 1 minute, using a table feeder. The air was supplied at the rate 1 $Nm^3/min$ and at a pressure in the range of 1-6 $kg/cm^2$.

(2) Settlement test

A beaker with a capacity of 100 ml and measuring 70 mm in height was filled about 80% full with water and 2 g of the grouting agent was sprinkled onto the surface of the water in the beaker. The beaker was then gently shaken and the time required for the entire amount of the grouting agent to settle to the bottom was measured.

(3) Agglomeration test 10 ml of water was added in small quantities to, and thoroughly kneaded with, 20 g of the grouting agent in a Petri dish. The mixture was then allowed to stand and the time required for it to lose its plasticity, as tested by poking it with a glass rod, was measured.

(4) Coefficient of permeability

Water was injected into the model sand layer into which a grouting agent had been blown in test (1), using a 1-2 meter water column, and the result was left to mature in water for 1-3 weeks, until agglomerated. Water pressure equivalent to a 2 meter water column was then applied to the model sand layer and the coefficient of permeability was measured.

(5) Slip factor test

The shearing stress of the grouting agent was measured using a powder bed tester (Model PTH manufactured by Sankyo Dengyo Co., Ltd., Japan), at a shearing area of 35 cm$^2$, a pre-load density of 29.71 g/cm$^2$ and a shearing speed of 62 mm/min. The results obtained in these tests are summarized in following table.

| | Example 1 | Example 2 | Comparative Example (MC cement) |
|---|---|---|---|
| Penetration depth reached | Passed 100 mm to bottom | Passed 100 mm to bottom | Almost no penetration |
| Settlement time (min) | 4 | 1 | 0 |
| Agglomeration time (hr) | 7 | 3 | 1 |
| Coefficient of permeation cm/sec | $3.1 \times 10^{-5}$ | $6.4 \times 10^{-5}$ | $7.2 \times 10^{-1}$ |
| Shearing stress — Vertical stress (g/cm$^2$) | 1.09 g/cm$^2$ 8.66 12.54 | 0.86 g/cm$^2$ 6.52 9.23 | 0.89 g/cm$^2$ 6.71 9.51 |
| | | | 1.00 g/cm$^2$ 7.48 10.46 |

From the above results it will be noted that while untreated MC cement did not penetrate the 100 mm model sand layer to any appreciable degree, the grouting agents of Example 1 and Example 2 according to this invention were easily able to penetrate to the bottom of the sand layers. This can be seen to be because the grouting agents of Examples 1 and 2 exhibited lower shearing stress values and accordingly higher slide factors than the MC cement.

It will be noted that the grouting agent of Example 1 exhibited lower shearing stress values and a higher slide factor than that of Example 2 and that the settlement time and agglomeration time for Example 1 were also both longer. This is because of the higher water repellency of the grouting agent of Example 1 exhibited as a result of containing five times more water-soluble silicon resin and less surface active agent than the grouting of Example 2. The grouting agent of Example 1 is thus suitable for firming the ground at deep levels while that of Example 2 is suitable for firming the ground at shallow levels.

Moreover, it will be noted that the coefficients of permeability of the grouting agents of Examples 1 and 2 are on the $10^{-5}$ order and thus have sufficient effect for formation of a water-barrier wall. This is in contrast to the MC cement alone which was incapable of forming an effective water-barrier wall because, first, it achieved almost no penetration of the model sand layer and, second, it exhibited a low slide factor.

What is claimed is:

1. A dry grouting agent comprising cement particles having baked on the surface thereof a coating including 0.2-20 parts per 100 parts of cement of a water-soluble silicon resin and 0.01-10 parts per 100 parts of said cement of a surface active agent.

2. A dry grouting agent according to claim 1 wherein the thickness of said coating is 1-100 nanometer.

3. A method of producing a dry grouting agent comprising the steps of preparing a liquid mixture including 0.2-20 parts per 100 parts of cement of a water-soluble silicon resin, 0.01-10 parts per 100 parts of cement of a surface active agent and an oily solvent, adding the liquid mixture to cement particles and uniformly kneading it therewith, heating the result to evaporate off said oily solvent and water and to bake onto the cement particles a coating layer containing the water-soluble silicon and the surface active agent, and cooling and pulverizing the resulting agglomerated mass.

4. A method according to claim 3 wherein the diameter of said cement particles is in the range of 2-7 $\mu$m.

5. A method according to claim 3 wherein the amount of said oily solvent added is 1-50 parts per 100 parts of said cement.

6. A method according to claim 5 wherein said oily solvent is methanol.

7. A method according to claim 3 wherein said cement particles to which said liquid mixture has been added is maintained at 60°-100° C. to evaporate said oily solvent.

8. A method according to claim 3 wherein said cement particles are maintained at 100° C. to bake said water-soluble silicon resin on the surface of said cement particles as a vitreous coating.

9. A method according to claim 3 wherein said cement particles having said coating baked thereon are first obtained as an agglomerated mass and then pulverized into individual particle in a crusher.

* * * * *